Figure 1:
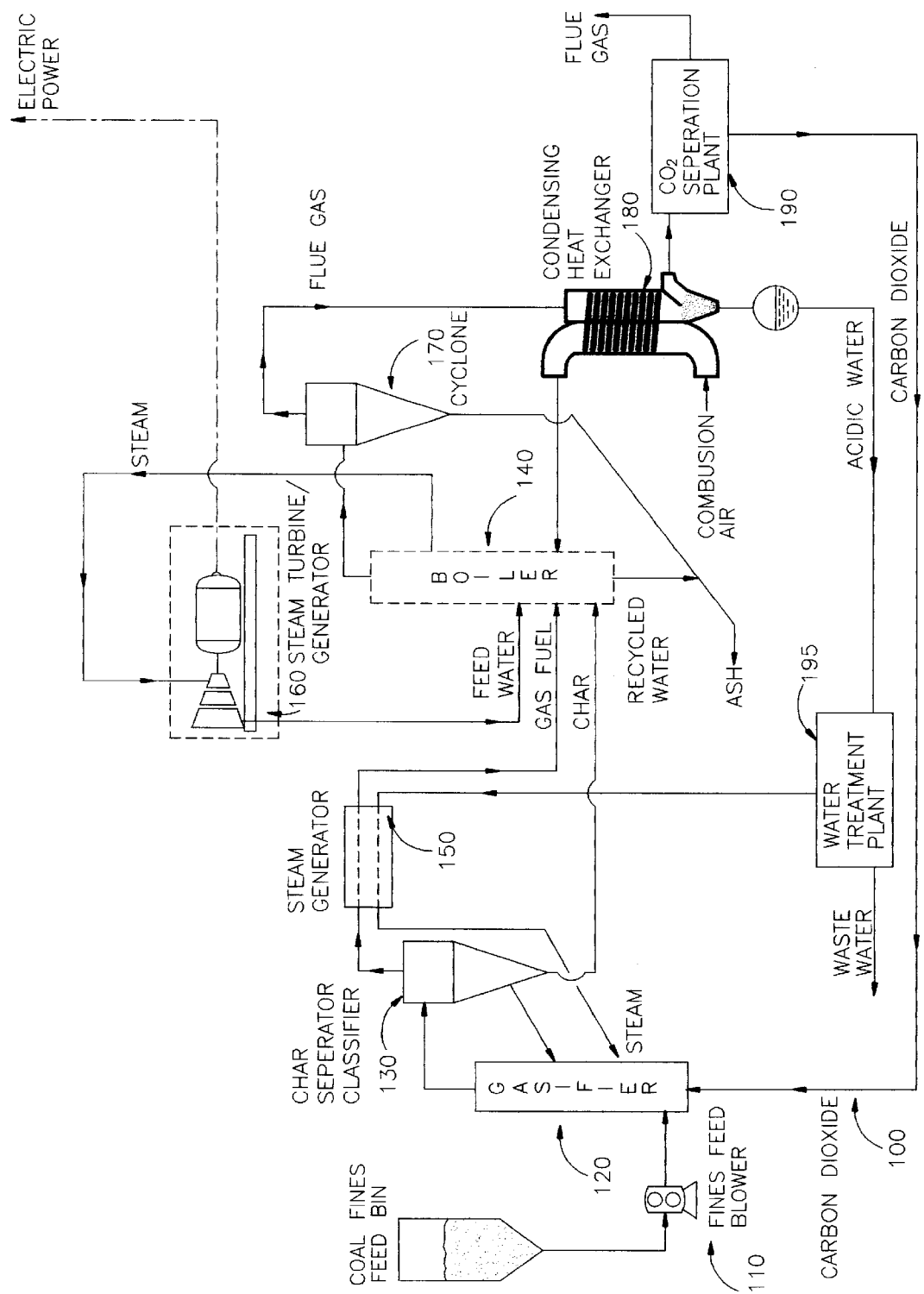

United States Patent [19]
Abdelmalek

[11] Patent Number: 5,937,652
[45] Date of Patent: Aug. 17, 1999

[54] PROCESS FOR COAL OR BIOMASS FUEL GASIFICATION BY CARBON DIOXIDE EXTRACTED FROM A BOILER FLUE GAS STREAM

[76] Inventor: Fawzy T. Abdelmalek, 12807 Willowyck Dr., St. Louis, Mo. 63146

[21] Appl. No.: 08/987,028

[22] Filed: Dec. 9, 1997

Related U.S. Application Data

[63] Continuation-in-part of application No. 07/977,138, Nov. 16, 1992, Pat. No. 5,321,946, application No. 08/251,322, May 31, 1994, Pat. No. 5,607,011, and application No. 08/011,870, Feb. 1, 1993, Pat. No. 5,403,569.

[51] Int. Cl.⁶ .................................................. F01K 17/00
[52] U.S. Cl. ............................ 60/648; 60/649; 60/650; 60/653
[58] Field of Search ............................ 60/648, 649, 650, 60/653, 682

[56] References Cited

U.S. PATENT DOCUMENTS

| | | | |
|---|---|---|---|
| 4,126,000 | 11/1978 | Funk | 60/648 |
| 4,594,140 | 6/1986 | Cheng | 60/648 X |
| 4,977,745 | 12/1990 | Heichberger | 60/648 X |
| 5,321,946 | 6/1994 | Abdelmalek | 60/648 |
| 5,403,569 | 4/1995 | Abdelmalek | 423/242.7 |
| 5,421,166 | 6/1995 | Allam et al. | 60/648 X |
| 5,607,011 | 3/1997 | Abdelmalek | 165/104.14 |

*Primary Examiner*—Hoang Nguyen
*Attorney, Agent, or Firm*—Veo Peoples, Jr.

[57] ABSTRACT

Carbon dioxide; from a boiler flue gas stream is separated, recycled and utilized for gasification of coal or biomass to increase fuel utilization and to decrease the carbon dioxide emissions into the atmosphere.

4 Claims, 3 Drawing Sheets

PROCESS FOR COAL OR BIOMASS FUEL GASIFICATION BY CARBON DIOXIDE EXTRACTED FROM A BOILER FLUE GAS STREAM

The present invention is a continuation in part of my U.S. Ser. No. 07/977,138, filed Nov. 16, 1992, U.S. Ser. No. 08/011,870, filed Feb. 1, 1993, and U.S. Ser. No. 08/251,322, filed May 31, 1994, now U.S. Pat. Nos. 5,321,946; 5,403,569; and 5,607,011, respectively in which I disclosed methods for clean-up of boiler flue gas by cooling and condensing its acidic water vapor, separation and liquefaction of sulfur dioxide and carbon dioxide gases. More particularly, it relates to a method for gasification of coal or biomass fuel by using carbon dioxide separated from the boiler flue gas. The process increases the utilization of coal or biomass fuel for producing energy while reducing the emissions of carbon dioxide into the atmosphere.

BACKGROUND OF THE INVENTION

1. Field of the Invention
2. Description of the Prior Art

Emission of carbon dioxide ($CO_2$) from electric power plants and other industrial boilers is a major contributor to climate changes and increases the global warming effect.

The vast majority of the carbon dioxide emissions into the atmosphere comes from burning fossil fuels which contributes to the problem of global warming. As the majority of the developing countries continue their fast rate of development, they will burn fossil fuels and emit carbon dioxide at much higher rates than ever. If no measures are taken to cap or slow down the emission of carbon dioxide; it will accelerate the climate warm up which is estimated to gain five to eight degrees Fahrenheit during the next century, and may cause catastrophic environmental effects due to the expansion of the ocean waters and melting of the polar ice cap. At the global warming summit of 1997 in Koyo, Japan, the U.S. and the International Community have started a global effort to protect the environment from the global warming effect. The U.S.A. is required by the year 2010 to reduce the carbon dioxide ($CO_2$) emissions by a minimum of 15% down to the levels of 1990 emissions. The object is to achieve capping the greenhouse gas emissions without crippling the economy or increasing the cost of generating electricity. The goal has been established to stabilize the greenhouse emissions by year 2010 and has raised the concerns of the U.S. economists who claim that adopting a policy to slow the global warming effect will harm the American Standard of living; except if the measures would improve the productivity through increasing the utilization of energy efficient technologies and if new innovations are adopted to reduce the emissions of carbon dioxide into the atmosphere.

Known options for reducing $CO_2$ emissions into the atmosphere include long term storage of $CO_2$ gas underground or in the ocean, industrial utilization of $CO_2$ emitted by the power plants, microalgae conversion of $CO_2$ to biomass and foresting or tree planting.

Known concepts to achieve the reduction of carbon dioxide emissions from electric generating power plants are substituting natural gas for coal because burning coal produces much more carbon dioxide than natural gas; gasification of coal; increasing the use of nuclear power; increasing the use of renewable energy and conserving the use of energy.

Coal is a major natural resource in the U.S., Eastern Europe, China, and many other countries around the globe. In the U.S. 55% to 60% of the electric power generated is from coal fired power plants. Coal gasification processes and equipment are commercially available for the production of synthesis gas which burns cleaner and emits less carbon dioxide; however, they are based on using oxygen from air for the gasification reactions which make them very expensive and can not compete with the less expensive natural gas fuel reserves.

In my U.S. Patents; I disclosed methods and systems for developing a high efficiency/low emissions coal fueled power plant boiler system with improvements to the boiler flue gas cleaning placed down stream from the flue gas particulate removal equipment, the improvements which are referred to as "flue gas cleaning by condensing and liquefaction of sulfur dioxide and carbon dioxide". The present invention provides another step and discloses a process in which carbon dioxide extracted from the flue gas is recycled and utilized for gasification of the coal fuel to produce synthesis gas and char. The synthesis gas and char may be burned in a conventional boiler to produce steam for a steam turbine-generator to generate electric power while the synthesis gas may be burned in a gas turbine to generate electricity in combination with a steam turbine/generator.

Since the 1950's oxygen and steam are used for coal or biomass solid fuel gasification. The coal gasification chemistry reactions are well known and are generally demonstrated as follows:

  ①

  ②

  ③

  ④

Reaction ③ indicates an intermediate step in the oxygen based gasification process where one molecule of carbon dioxide extracted from the flue gas reacts with one molecule of carbon in the coal to produce two molecules of carbon monoxide. Carbon monoxide is the main ingredient for producing synthesis gas. In oxygen or air based combustion gasifiers, oxygen in the flue gas slow down or inhibit the reaction to produce carbon monoxide in the gasification process, effectively this prevents de-association of the carbon dioxide into carbon monoxide and decreases the efficiency of the gasification process. Psychometric control of oxygen inside the oxygen based gasifier is very critical to maximize formation of carbon monoxide and hydrogen.

The oxygen based coal gasification process has been demonstrated in several power plants employing the well known integrated gasification combined cycle (IGCC) where low BTU synthesis fuel is produced and burned directly in a gas turbine for generating electric power. Residual heat in the exhaust of the gas turbine is used to generate steam for conventional steam turbine generators to produce more electricity in combination with power generated from the gas turbine system.

At the Tampa Electric Company in Polk County Florida, an Integrated Gasification Combined Cycle (IGCC) where coal water slurry and oxygen are combined at thigh temperature and pressure to produce a high temperature synthesis gas directly fired in the gasifier to produce hot flue gas and steam.

At the Wabash River Coal Gasification project, Terre-Haute, Indiana, the coal is ground, slurried with water and gassified in a pressurized two stage oxygen blown gasifier. The hot fuel gas is cooled in a steam generator heat exchanger to produce high pressure steam utilized to drive a steam turbine driving an electric generator. The cooled fuel gas is then fired in a gas turbine which drives another electric generator.

At the Pinon Pine IGCC power project of the Sierra Pacific Power Company an air blown, pressurized, fluidized gasifier technology was used to produce low BTU gas at 295 psia and 1800° F. In conventional air blown/combustion fluidized bed gasifiers the synthesis gas product is diluted with nitrogen or with the combustion of flue gases. Oxygen blown gasifiers are typically used to reduce nitrogen and produce higher heating value of product gas, however the cost of oxygen separation plants is prohibitive.

In all these and other prior art technologies; oxygen is used for the direct oxidation of carbon to form carbon monoxide at a high temperature range in a pre-combustion stage. This reaction could be inhibited by the presence of excess oxygen in the gasifier which limits the gasification process and yields char with a large percent of the solid carbon not gasified but remains un-reacted.

In the present invention, the gasification of coal is achieved by using carbon dioxide and steam in the absence of oxygen. At elevated temperatures and pressure, preferably in the range of 1400 to 1800° F and up to 350 psig, carbon dioxide dis-associates and radical oxygen reacts with the carbon in the char to form carbon monoxide. The separation of the gasification reactions and the combustion into two steps achieve much higher efficiency and lower emission levels along with higher Btu synthesis gas products.

In the absence of oxygen, carbon dioxide defuses through the char layer gasifying the char with gasification reaction as follows:

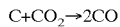

$$C + CO_2 \rightarrow 2CO$$

The reaction is known to be an endothermic reaction which requires heat input supplied by the partial oxidation of carbon from the immediate vicinity of the char solid particle.

In a similar reaction and under the same circumstance $H_2O$ (steam) reacts with the carbon as follows:

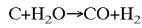

$$C + H_2O \rightarrow CO + H_2$$

The thermo-chemical reactions of carbon dioxide and steam with carbon yield carbon monoxide and hydrogen without the need of oxygen for gasification. Both carbon monoxide and hydrogen are combustible gases and are the basic ingredients to form synthesis gas which is known as water gas of a general formula ($CO—H_2$). Part of the synthesis gas can be used to provide supplemental heating in the gasifier using indirect fire tube furnace or pulse heating tube banks projected inside the bulk of the gasifier.

The present invention takes advantage of the reaction of carbon dioxide with the carbon in the coal to reduce the carbon emissions and increase the fuel utilization in coal fired or biomass fueled power plants. This innovative technology will support the need to continue using the coal as a viable domestic fuel. It will be economically feasible to repower conventional pulverized coal power plants for both atmospheric and pressurized steam boiler systems with synthesis gas and char produced from carbon dioxide gasification of coal in an Integrated Gasification Combined Cycle (IGCC) configuration to achieve the goal of high efficiency/low emission coal fired power plants.

In so far as is known the present invention as described herein is the first to employ carbon dioxide extracted from the boiler flue gas for the gasification of coal or biomass solid fuels.

3. SUMMARY OF DRAWINGS

FIG. 1: Is a schematic diagram for a carbon dioxide based fluidized bed gasifier in combination with a conventional steam boiler system.

Figure 2:
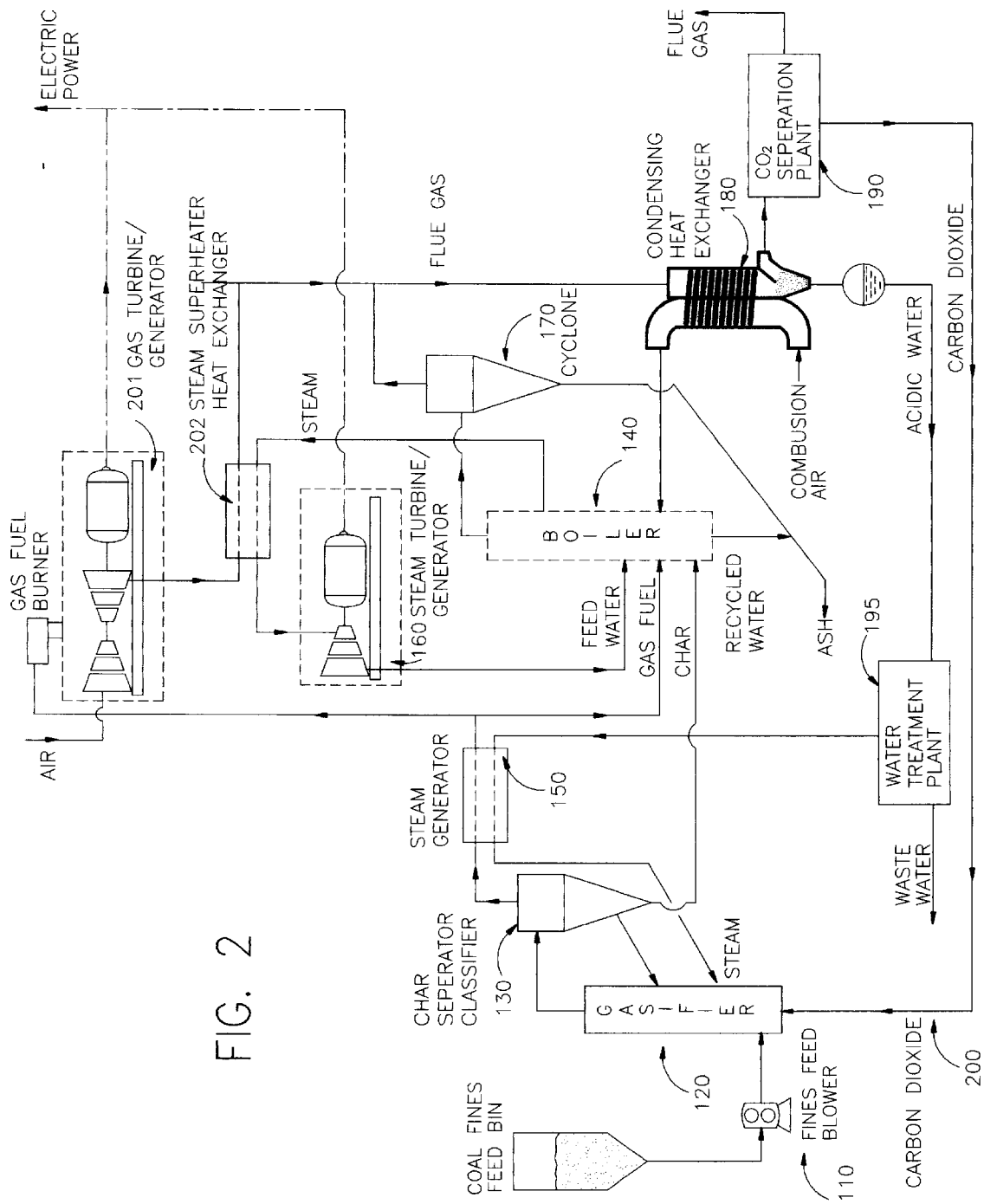

FIG. 2: Is a schematic diagram for a carbon dioxide based fluidized bed gasifier in combination with an advanced Integrated Gasification Combined Cycle (IGCC) power plant.

Figure 3B:
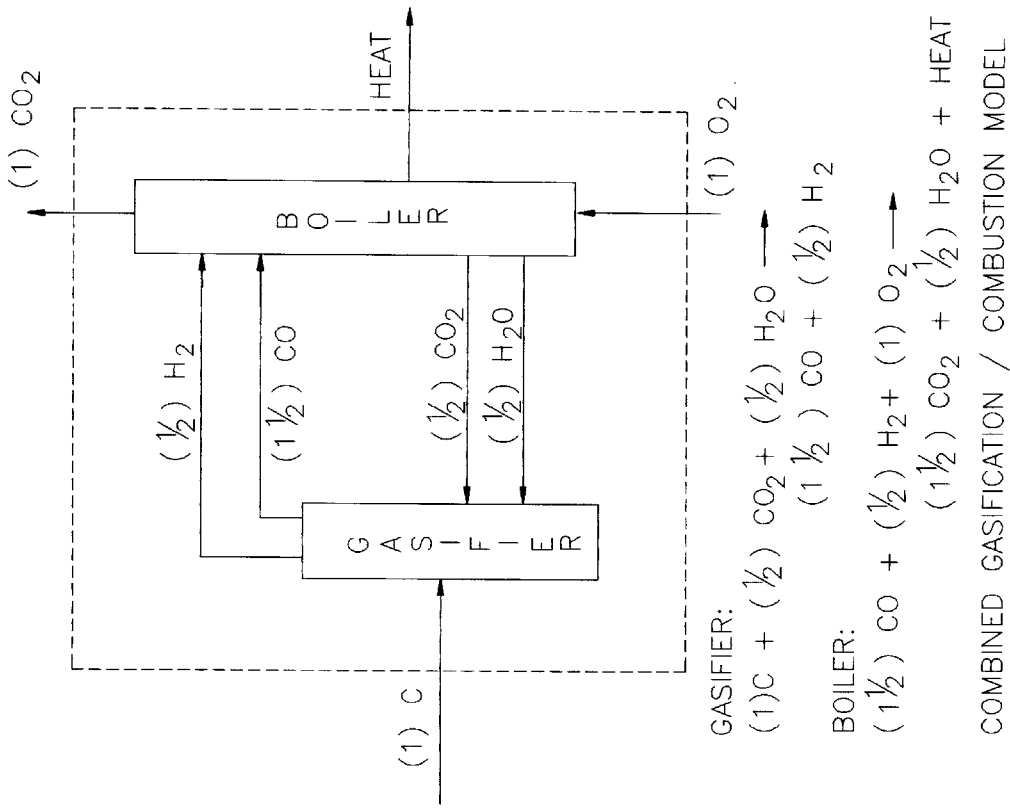
Figure 3A:
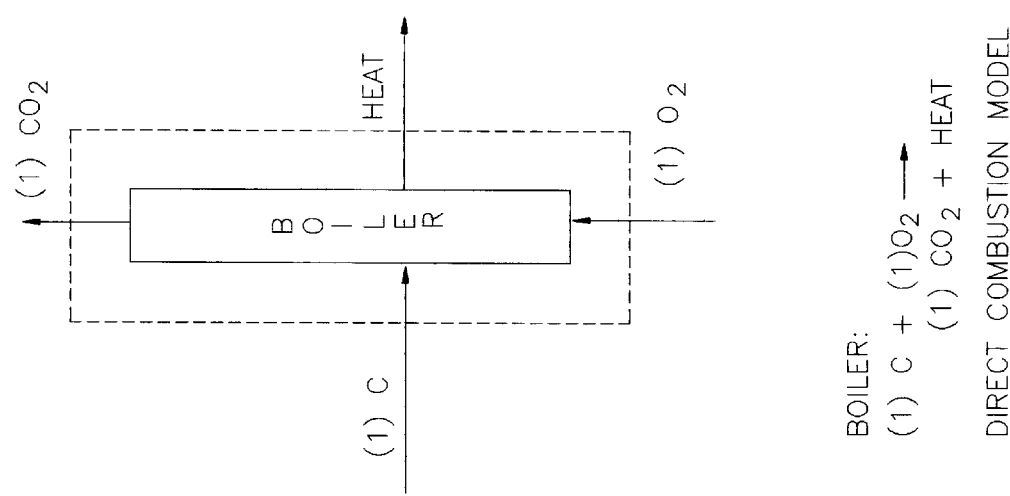

FIG. 3a: Indicates a block diagram for a model for conventional coal combustor

FIG. 3b Indicates a block diagram for a model for combined gasification and combustion.

4. SUMMARY OF THE INVENTION

It is therefore a principle object of the present invention to provide an improved method for solid fuel (coal or biomass) utilization by using carbon dioxide for gasification of the fuel.

It is further a principle object of the present invention to recycle carbon dioxide extracted from a boiler flue gas stream for the gasification of the solid fuel.

It is also a principle object of the present invention to reduce carbon emission from fossil fueled boiler system.

It is further a goal of the present invention to economically repower conventional pulverized coal power plants in advanced Integrated Gasification Combined Cycle (IGCC) configuration using carbon dioxide gasification process.

It is further an object of the present invention to conserve energy, improve the efficiency and reduce the heat rate to generate power from fossil fuel power plants.

The above and other objects and advantages of the present invention will become apparent from the following specifications; drawings and claims. It will be understood that particular embodiments of the invention are shown by way of illustration only, and not as limitation of the invention. The principle features of this invention maybe employed in various embodiments without departure from the scope of the invention.

5. DETAILED DESCRIPTION OF THE PRESENT INVENTION

Emissions of carbon dioxide from coal or biomass fueled power plants in a major contributor to the increased carbon dioxide in the atmosphere and the global warming effect. The objective to continue using coal for producing electricity is supported mainly because coal reserves are the largest known fuel resources available in the U.S. and in many other countries around the world. New innovative technologies are needed to increase the utilization of coal and to reduce carbon dioxide emissions into the atmosphere.

Coal and biomass gasification processes using blown air or oxygen in direct combustion gasifiers are well known and have been demonstrated in many projects for generating electric power using the newly advanced technology of the Integrated Gasification Combined Cycle (IGCC) in which a combination of gas fired turbine and steam driven turbine are employed to generate electric power.

Air or oxygen are used for gasification of coal in a direct combustion heating process, where two phase oxidation takes place in the gasification process: the pyrolysis phase and the char oxidation phase. In the pyrolysis process the coal (or biomass) feed is dried and the volatiles contained therein are evolved and oxidized readily in the furnace. The physical process of pyrolysis involves significant loss of the coal particle mass. The completion of the evolution of the volatiles from the fuel particle separates solid particle pyrolysis phase from the char oxidation phase.

Once the coal particle is completely dried, carbon rich reactive char is oxidized as follows:

$$C + O_2 \rightarrow CO_2 \qquad (5)$$

$$C + \tfrac{1}{2} O_2 \rightarrow CO \qquad (6)$$

Reaction ⑥ is followed by gas phase oxidation of CO to $CO_2$ in the high temperature environment of the furnace. At higher temperatures (above 1800° F.) reaction ⑥ become more significant than reaction ⑤, and the ratio of $CO/CO_2$ produced can be as high as 21:1. Gasification of the coal in this phase yields carbon monoxide gas.

In the present invention the reaction of carbon with carbon dioxide and steam at high temperatures takes place in the absence of oxygen (from air) and contribute to char oxidation as follows:

$$C + CO_2 \rightarrow 2CO \qquad (7)$$

$$CO + H_2O \rightarrow CO_2 + H_2 \qquad (8)$$

If oxygen is present in the bulk of the gasifier; reactions ⑦ and ⑧ will be much slower and maybe inhibited because of the dominance of the much faster oxidation of the carbon by the oxygen.

The rate of char oxidation is influenced by particle size, porosity, moisture content, ash content, and volatility.

Reaction ⑤ and ⑥ are exothermic and considerably faster in nature which normally occurs in the combustion process to produce heat while reactions ⑦ and ⑦ are endothermic, much slower and requires heat input for reaction which is normally supplied from the immediate vicinity of the particle in the gasifier. At high temperature (above 1800° F.) the gasification reaction is relatively fast. The structure of the char particle looses integrity, disintegrates and generates free carbon which reacts with the carbon dioxide and steam to form carbon monoxide and hydrogen.

6. OPERATION

FIG. 1 indicates a simplified schematic diagram for a carbon dioxide based coal gasifier in combination with a steam boiler system 100. Pressure blower 110 feeds fine coal particles into the gasifier 120. The coal particles almost instantaneously are dried and broken into reactive molecules when they come into contact with steam and carbon dioxide at the gasifier elevated temperatures. The reaction of the coal with the carbon dioxide and steam in the absence of oxygen yields carbon monoxide, hydrogen gaseous products and other hydrocarbons and char particles. Fluidized bed temperature in the range of 1400° F. to 1800° F. and reaction pressure of up to 350 psia may be maintained in the gasifier. The product gas flowing from the gasifier 120, basically a mixture of carbon monoxide, hydrogen and hydrocarbon products known as synthesis gas. Solids separator/classifier equipment then removes the solids from the gas products flowing from the gasifier and classifies the char solid particles. The solid particles which are completely reacted will be more dense and will be separated and conducted to the steam boiler 140, while the solid particles which are partially reacted will be lighter and when separated are conducted back to the gasifier 120. The clean synthesis gas products flowing from the top of the cyclone separator 130 are then conducted to the steam generator heat exchanger 150 to produce steam for the gasifier, the cooled synthesis gas is then conducted to boiler 140 and burned with the char using sufficient oxygen for complete combustion to produce high pressure steam needed to drive the electric power steam turbine/generator 160. The solid particulate matter in the flue gas stream flowing from the boiler 140 are then removed in a conventional particulate removal system cyclone 170, the flue gas is then cooled in a condensing heat exchanger 180, where most of the flue gas emissions including all hazardous metal vapors and nitrogen oxides are removed by thermochemical reactions as described previously in my U.S. patent document 5,607,001. The cooled flue gases are then processed to a gas separation and liquefaction plant 190 to separate sulfur dioxide and carbon dioxide from the flue gas as described in my U.S. Pat. Nos. 5,403,569 and 5,321,946. Part of the carbon dioxide flowing from the gas separation plant 190 is then recycled to the coal gasifier 120. Steam required for the thermo-chemical reaction in the gasifier is generated in the steam generator 150. The acidic water condensate flowing from the condensing heat exchanger 180 is treated in a water treatment plant 195 and utilized for producing the steam required for the gasifier 120.

In the gasifier 120 sufficient carbon dioxide and steam are injected to provide a proper fluidization velocity, as the coal feed dries, devolatizes and reacts with the carbon dioxide and steam thermochemically to produce synthesis gas high in carbon monoxide and hydrogen. When coal contains sulfur, part of the hydrogen ($H_2$) reacts with the sulfur (S) from the coal to form other hydrogen sulfide $H_2S$. Very low concentration of higher hydrocarbons are also produced and emitted in gaseous form. At the elevated fluidized bed temperatures in the range of 1400° F. to 1800° F. and at higher pressures of up to 350 psia more effective gasification process can be designed. The synthesis gas and char particles flowing from the gasifier are then separated in a hot gas separator where the cleaner synthesis gas is released from the top and the less dense solid particles are separated, classified and conducted back to the gasifier while the heavier or more dense solid particles, completely reacted char; is conducted to the steam boiler.

FIG. 2 indicates a simplified schematic diagram for a carbon dioxide based coal gasifier in combination with the Integrated Gasification Combined Cycle (IGCC) power plant system 200. The gasifier 120 operation is the same as described for system 100. The product synthesis (fuel) gas flowing from the gasifier 120 is conducted to a char removal cyclone 130 then cooled in the steam generator heat exchanger 150. The cleaned and cooled fuel gas is then combusted in the fuel burner of the gas turbine/generator 201. Gas turbine 201 is of a standard high efficiency jet propulsion type, it operates at much higher firing temperature and has a much higher power cycle efficiency when compared to the high pressure steam turbine power cycle. The hot gas exhaust from the gas turbine is then conducted in a high pressure steam generator 202 to superheat high pressure steam flowing from the boiler 140. The boiler flue gas flowing from the cyclone 170 is then combined with the cooled flue gas stream flowing from the gas turbine exhaust and then conducted into a condensing heat exchanger 180. The cooled and cleaned flue gases are then processed to separate carbon dioxide stream which is conducted back to the gasifier 120. Steam required for the thermo-chemical reaction in the gasifier is generated in the steam generator 150 and conducted to the gasifier 120. Acidic water condensate flowing from the condensing heat exchanger 180 is treated in a water treatment plant 195 and the treated water is utilized for the steam required for the gasifier. The boiler 140 is a conventional steam boiler and is fired with both fuel gas and solid fuel to generate steam to drive the turbine/generator 202. The combined coal gasification with carbon dioxide gas and the integration gas turbine and steam turbine cycle will provide a new configuration of advanced high efficiency and low emissions power plant.

FIGS. 3a and 3b indicate two model cases for utilization the carbon for generating heat. For simplicity and to clearly demonstrate the benefit of the new process of carbon gasification all other variables of combustion of coal and volatiles are not indicated herein and assumed to be equal in both cases:

CASE A: Is a model for a conventional direct combustion. The chemistry of carbon oxidation is expressed as follows:

$$(1)C+(1)O_2 \rightarrow (1)CO_2 + Heat$$

The gross heat generated in this case is equivalent to 173,280 Btu/lb—mole of carbon burned.

CASE B: Is a model for the combined gasification/combustion process. Firstly; the carbon is gasified using carbon dioxide and steam to produce synthesis gas in the gasifier. Secondly; synthesis gas is burned in the boiler. The chemistry of the gasification step is expressed as follows:

$$(1)C+(\tfrac{1}{2})CO_2+(\tfrac{1}{2})H_2O \rightarrow (1\tfrac{1}{2})CO+(\tfrac{1}{2})H_2$$

The heat input required for the gasification shall be supplied from the endothermermic reactions and the superheated steam and carbon dioxide at 1800° F. which is equivalent to 35,550 Btu/Lb mole of $H_2O$ and 21,912 Btu/Lb mole of carbon dioxide.

The chemistry of the combustion step of the synthesis gas products in the boiler is expressed as follows:

$$(1\tfrac{1}{2})CO+(\tfrac{1}{2})H_2+(1)O_2 \rightarrow (1\tfrac{1}{2})CO_2+(\tfrac{1}{2})H_2O + Heat$$

The rate of heat generated shall be equivalent to 121,604 Btu/Lb-mole of CO and 122,200 BtuA Lb-mole of $H_2$. The net heat generated/Lb-mole carbon processed can be calculated as follows:
a. Gross heat generated in the boiler=

$$((1\tfrac{1}{2})CO \times 121{,}604)+((\tfrac{1}{2})H_2 \times 122{,}200)=243{,}506 \text{ Btu.}$$

b. Heat input to the gasifier=

$$((\tfrac{1}{2}) \times H_2O \times 35{,}550)+((\tfrac{1}{2})CO_2 \times 21{,}912)=18{,}731 \text{ Btu.}$$

c. Net heat generated in case B=243,605−18,731=224,775 Btu

In summary, the above indicates higher utilization of carbon using the combined carbon gasification/combustion model (Case B) which will yield more heat output of 40,895 Btu/lb-mole of carbon processed when compared to the conventional direct combustion model (Case A). Approximately 20% less fuel can be burned and 20% reduction of carbon dioxide emissions from a power plant can be achieved in order to generate the same heat output. Higher thermal efficiencies by recovery of residual heat energy from the hot synthesis gas and from the boiler flue gas through a condensing heat exchanger to generate steam will further contribute to higher reductions in fuel burned and less carbon dioxide emitted.

This invented process will effectively reduce the heat rate of the power plant heat cycle by employing carbon dioxide based gasification process to produce synthesis gas from the coal in combination with a conventional steam boiler to drive a conventional steam turbine-generator electric power plant. The combination of the new process and the advanced Integrated Gasification Combined Cycle (IGCC) power plant will benefit in achieving much higher efficiencies and much lower emissions. It is understood that the mass flow rates, operating temperatures and pressures given are only to demonstrate the merit of the present invention, and that the given values are based upon certain particulars which may vary.

It is also understood that the gasifier/boiler system may be of atmospheric or pressurized type which are commercially available and well known in the prior art.

What is claimed:

1. A process for gasification of coal using carbon dioxide extracted from fossil fueled boiler flue gas; the process which comprises the following steps;
   a. receiving and conducting a feed of coal fines into a fluidized bed gasifier with sufficient carbon dioxide gas and steam at elevated temperature and pressure to effectively dry and gasify the coal;
   b. conducting the synthesis gas and char flowing from the gasifier into a solids separator/classifier to effectively separate the synthesis gas and classify a relatively lighter char solids from relatively heavier char solids;
   c. conducting the relatively lighter char solids back to the gasifier;
   d. conducting the relatively heavier char solids into a steam boiler combustion chamber;
   e. conducting the synthesis gas stream flowing from the solids separator into a steam generator heat exchanger to effect cooling the synthesis gas and evaporating the water stream to a superheated steam;
   f. injecting the cooled synthesis gas products flowing from the steam generator heat exchanger into the steam boiler combustion chamber;
   g. conducting the flue gases flowing from said steam boiler into a condensing heat exchanger to exchange heat energy contained therein and preheat a boiler combustion air stream and a boiler feed water stream;
   h. conducting the cooled flue gases flowing from the flue gas condensing heat exchanger to a carbon dioxide gas separating plant;
   i. conducting the carbon dioxide flowing from the gas separating plant into the coal gasifier;
   j. conducting and injecting the superheated steam flowing from the steam generator heat exchanger into the coal gasifier.

2. The combination of a carbon dioxide coal gasifier and a steam power plant where a steam boiler is fueled with a synthesis gas and char produced by gasification of coal in absence of oxygen using carbon dioxide separated from the boiler flue gas, the combination which comprises; p1 a. a coal fluidized bed gasifier where sufficient carbon dioxide and steam are injected to provide proper fluidization velocity and residence time for the coal to dry, devolatize, and for carbon in the coal to react with carbon dioxide and steam to produce synthesis gas and solid char products;
   b. solids separator/classifier where hot synthesis gases are separated, and the solid particles are classified to separate char having more dense particles from relatively not completely reacted char having less dense particles;
   c. a steam generator heat exchanger to cool the synthesis gas and generate steam required for the gasifier;
   d. a steam boiler fueled with combination of synthesis gas and char flowing from the gasifier;

e. a steam turbine/generator driven by the steam flowing from the boiler and generating electricity;

f. a boiler flue gas dust collection system to remove solid particulates contained in the flue gas stream;

g. a condensing heat exchanger where heat energy from the relatively hot flue gases is exchanged to preheat a boiler combustion air stream and a boiler feed water stream;

h. a gas separating plant where carbon dioxide is separated from the cooled boiler flue gas stream and conducted to the coal gasifier.

3. The combination of carbon dioxide coal gasifier and an advanced integrated combined cycle where synthesis gas produced in the gasifier is used to fuel a gas turbine and steam generated in a boiler is used to drive a steam turbine to generate electric power, the combination which comprises;

a. a coal fluidized bed gasifier where sufficient carbon dioxide and steam are injected to provide proper fluidization velocity and residence time for the coal to dry, devolatize and for carbon in the coal to react with carbon dioxide and steam to produce synthesis gas and char;

b. solids separator/classifier where hot synthesis gases are separated and solid particles are classified to separate completely reacted char having relatively more dense particles from partially reacted and relatively lighter particles;

c. a steam generator heat exchanger to cool the synthesis gas and generate steam for the coal gasification;

d. a gas fueled jet propulsion turbine/generator fueled with the synthesis gas to produce electricity;

e. a steam boiler fueled with a combination of synthesis gas and char to produce high pressure steam;

f. a heat exchanger to cool an exhaust gas stream flowing from the gas turbine and to superheat a high pressure steam flowing from the steam boiler;

g. a steam turbine/generator driven by a high pressure steam flowing from said turbine exhaust gas heat exchanger;

h. a boiler flue gas dust collection system to remove solid particulates contained in the flue gas stream;

i. a condensing heat exchanger where heat energy from the relatively hot flue gases, is exchanged to preheat a boiler combustion air and boiler feed water streams;

j. a gas separating plant where carbon dioxide is separated from the cooled flue gas stream and conducted to the coal gasifier.

4. The process of claim 1 for the gasification of biomass fuel wherein biomass is used as a fossil fuel in a power plant and where carbon dioxide separated from a boiler flue gas stream is used for the gasification of biomass fuel.

* * * * *